United States Patent
Pujari et al.

(10) Patent No.: US 7,534,388 B2
(45) Date of Patent: May 19, 2009

(54) METHOD OF MAKING CERAMIC COMPONENT CONTAINING INCLUSIONS

(75) Inventors: Vimal K. Pujari, Northboro, MA (US); Jeffrey J. Kutsch, Oxford, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 384 days.

(21) Appl. No.: 11/078,599

(22) Filed: Mar. 11, 2005

(65) Prior Publication Data

US 2005/0156341 A1    Jul. 21, 2005

Related U.S. Application Data

(62) Division of application No. 10/454,084, filed on Jun. 4, 2003, now Pat. No. 6,953,760.

(51) Int. Cl.
*C04B 33/32* (2006.01)
(52) U.S. Cl. .................. 264/661; 264/669; 264/682
(58) Field of Classification Search ............. 264/682, 264/669, 122, 109, 661, 604; 501/88, 90
See application file for complete search history.

(56) References Cited

U.S. PATENT DOCUMENTS

| | | | |
|---|---|---|---|
| 4,041,117 A | 8/1977 | Prochazka | |
| 4,179,299 A | 12/1979 | Coppola et al. | |
| 4,525,461 A | 6/1985 | Boecker et al. | |
| 4,536,449 A | 8/1985 | Kennedy et al. | |
| 4,642,271 A | 2/1987 | Rice | |
| 4,690,909 A | 9/1987 | Okuno et al. | |
| 4,701,426 A | 10/1987 | Okuno et al. | |
| 4,829,027 A | 5/1989 | Cutler et al. | |
| 4,942,145 A | 7/1990 | Moehle et al. | |
| 5,422,322 A | 6/1995 | Chen et al. | |
| 5,442,322 A | 8/1995 | Kornfeld et al. | |
| 5,486,496 A | 1/1996 | Talbert et al. | |
| 5,543,368 A | 8/1996 | Talbert et al. | |
| 5,612,265 A | 3/1997 | Bullock et al. | |
| 5,639,407 A | 6/1997 | Talbert et al. | |
| 5,656,218 A | 8/1997 | Lin et al. | |
| 5,656,563 A | 8/1997 | Chen et al. | |
| 5,756,409 A | 5/1998 | van Dijen et al. | |
| 5,976,429 A | 11/1999 | Chen et al. | |
| 5,998,318 A | 12/1999 | Takanami et al. | |
| 6,030,913 A | 2/2000 | Heine et al. | |
| 6,352,611 B1 | 3/2002 | Han et al. | |
| 6,398,991 B1 | 6/2002 | Brazil et al. | |
| 6,716,800 B2 | 4/2004 | Demendi et al. | |
| 6,774,073 B2 | 8/2004 | Wilkins | |
| 2002/0010902 A1 | 1/2002 | Chen et al. | |
| 2002/0160902 A1 | 10/2002 | Lesniak et al. | |
| 2003/0195122 A1 | 10/2003 | Demendi et al. | |

FOREIGN PATENT DOCUMENTS

| | | |
|---|---|---|
| DE | 033 29 225 A1 | 2/1984 |
| DE | 197 27 115 A1 | 1/1998 |
| DE | 101 41 660 A1 | 3/2003 |
| EP | 0 709 352 A1 | 5/1996 |
| EP | 864549 A2 * | 9/1998 |
| JP | 63-011559 A | 1/1988 |
| JP | 11-079845 | 3/1999 |
| WO | WO 94/18141 | 8/1994 |

* cited by examiner

*Primary Examiner*—Carlos Lopez
(74) *Attorney, Agent, or Firm*—Larson Newman Abel Polansky & White, LLP; Robert T. Conway

(57) ABSTRACT

A ceramic component is disclosed, including a sintered ceramic body from a composition comprising a first ceramic material, and a plurality of inclusions in the ceramic body, each inclusion comprising graphite and a second material.

17 Claims, 2 Drawing Sheets

METHOD OF MAKING CERAMIC COMPONENT CONTAINING INCLUSIONS

CROSS-REFERENCE TO RELATED APPLICATION(S)

This application is a divisional application of U.S. application Ser. No. 10/454,084, filed Jun. 4, 2003, now U.S. Pat. 6,953,760, which is included in its entirety.

BACKGROUND

1. Field of the Invention

The present invention generally relates to ceramic materials, and more specifically, ceramic bodies having inclusions of lubricious material and processes for forming same.

2. Description of the Related Art

While ceramic materials such as silicon carbide have found particular use in a variety of industrial applications due to properties such as corrosion resistance and wear resistance, such ceramics oftentimes do not have sufficient lubricity for some applications. Accordingly, particularly in the area of silicon carbide ceramic bodies, graphite loading has been incorporated in an attempt to improve the friction properties, particularly lubricity at elevated temperatures. Such ceramic components have found practical use in a variety of applications, including use as seals in dry environments and wet environments such as automotive pump seals.

Graphite-loaded silicon carbide bodies have been fabricated through various techniques. For example, such bodies have been formed by the so-called reaction bonded process, in which the precursor, typically carbon, is reacted with molten silicon during a high-temperature operation to form silicon carbide. Such reaction-bonded bodies typically additionally contain carbon graphite as a secondary phase that remains in the ceramic body following reaction.

Another technique utilizes a direct solid-state sintering process, typically involving pressureless or pressure sintering of a shaped body formed through powder processing techniques.

While the foregoing fabrication techniques and resulting graphite-loaded silicon carbide bodies represent improvements in ceramic components requiring a high degree of lubricity, a need continues to exist in the art for further improved ceramic components and processes for fabricating same.

SUMMARY

According to a first embodiment of the invention, a ceramic component is provided, including a sintered ceramic body having a plurality of inclusions therein. The ceramic body is formed from a composition comprising a first ceramic material. In addition, the inclusions include graphite and a second ceramic material.

According to another embodiment of the present invention, a ceramic component is provided including a sintered ceramic body and a plurality of inclusions therein. The sintered ceramic body includes a first ceramic material, and each inclusion includes a first phase formed of a lubricious material, and a second phase formed of a second ceramic material.

According to yet another embodiment, a method for forming a ceramic component is provided. The method calls for providing a first ceramic material, forming granules comprised of graphite and a second ceramic material, forming a shaped body containing a first ceramic material and the granules, and sintering the shaped body.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
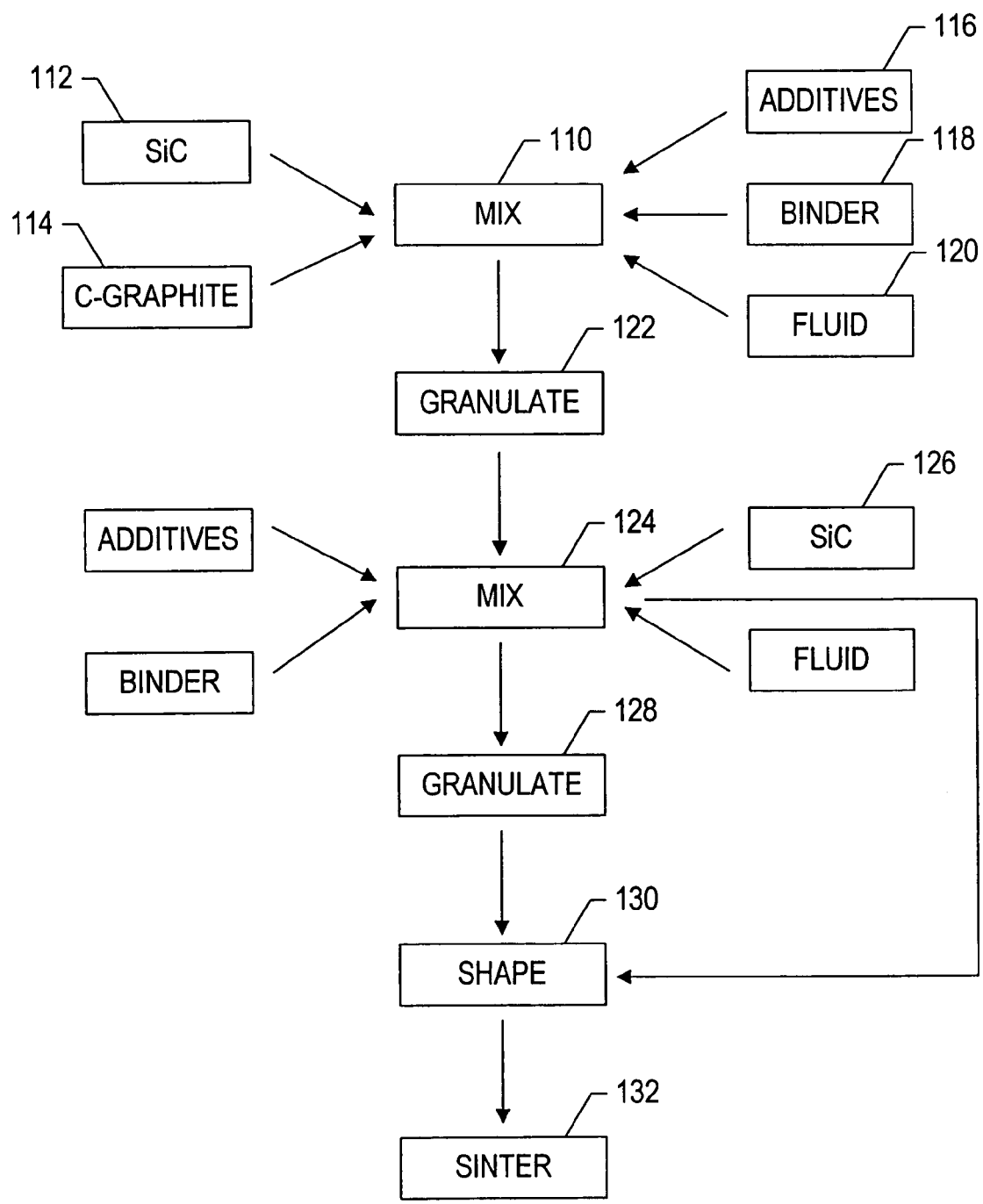
FIG. 1 is a process flow representing a particular fabrication technique according to an embodiment of the present invention to provide a ceramic component.

According to embodiments of the present invention, various techniques for forming ceramic bodies, and in particular, lubricious and/or graphite-containing ceramic bodies are provided, as well as ceramic bodies formed thereby. In this regard, turning to FIG. 1, a process for forming a ceramic body according to an embodiment of the present invention is depicted. First, various materials are mixed together at mixing step 110. Typically, the materials are mixed together to form a slurry, and include silicon carbide 112, typically in powder form containing fine particles, and carbon graphite 114, also typically in powder form containing fine particles. As is understood in the art, the graphite form of carbon has a particular platy or layered crystal structure in which carbon atoms in a graphitic plane are held together by strongly directional covalent bonds in a hexagonal array, and bonding between layers is provided by weak Van der Waals forces. This crystal structure largely contributes to the lubricious nature of the graphite. The silicon carbide may be alpha, beta, or combination of alpha and beta silicon carbide.

The particle size of the carbon material may vary widely, such as from a sub-micron particle size to about 30 microns, most typically about 1 to about 20 microns. Similarly, particle size of the silicon carbide may also vary, such as on the order of 0.1 microns to about 20 microns, typically on the order of about 0.05 microns to about 5.0 microns. Particular embodiments utilize silicon carbide powder having a particle size on the order of about 1 micron.

Further, sintering and/or processing additives 116 may be added to the mixture, as well as any binders 118 and a fluid 120. Exemplary sintering aids include boron and carbon-based sintering aids. Particular examples include boron added as $B_4C$, whereas a carbon sintering aid may be derived from any carbon containing polymer such as phenolic resin. Exemplary concentrations include 0.5 weight percent boron and 3.0 weight percent carbon. The weight percentage of the carbon may be reduced such as on the order of 1.0 to 2.0 weight percent through reduction in phenolic resin. However, in such a case additional binders for green strength may have to be added. Typically, fluid 120 is water, forming an aqueous mixture also known as a slurry. The silicon carbide 112 may be present within a range of about 5 weight percent to about 65 weight percent with respect to the total of silicon carbide 112 and graphite 114, leaving graphite present within a range of about 35 weight percent to about 95 weight percent with respect to the total of silicon carbide and graphite. Most typically, silicon carbide is present in an amount of about 10 weight percent to about 50 weight percent, the balance being substantially graphite.

After formation of a stable slurry at mixing step 110, the slurry is granulated to form composite granules containing the major components silicon carbide 112 and graphite 114, as well as any processing/sintering additives 116 and binders 118. Granulation at step 122 may be carried out by various techniques, the most commonly used technique being spray-drying, well understood in the art. In addition to spray drying, the composite granules may be formed by casting, such as drip casting, also understood in the art.

The granulating step is carried out such that the composite granules have an average granule size within a range of about 10 microns to about 400 microns, typically about 10 microns to about 200 microns, and even more typically, about 20 microns to about 150 microns. The composite granules are stable agglomerates that contain two main phases, that of the silicon carbide raw material and the graphite raw material.

Following formation of the composite granules, the granules are mixed with additional components at mixing step 124. As with mixing step 110, sintering/processing additives, binders and a fluid (typically water) are mixed to form a slurry containing the composite granules from granulating step 122. In addition, silicon carbide is also added to the slurry. The silicon carbide 126 may be formed of essentially the same material as silicon carbide 112. As such, the silicon carbide is generally in powder form, and may include alpha silicon carbide, beta silicon carbide, or mixtures thereof. Relative weight percentage of composite granules in the mixture is generally not greater than about 35 weight percent of the total of the silicon carbide 126 and the composite granules. Accordingly, the composite granules, forming inclusions, generally make up not greater than about 35 weight percent of the final form of the ceramic component according to embodiments of the present invention. Most typically, the composite granules are present in an amount not greater than about 25 weight percent, and generally within a range of about 5 weight percent to about 25 weight percent.

After formation of a slurry by mixing step 124, the slurry is generally granulated according to step 128 to form secondary granules, in similar fashion to step 122. As with granulating step 122, granulating at step 128 is typically carried out by spray drying, although alternative forms of granulating may be carried out. The resulting secondary granules from granulating step 128 generally comprise the SiC/C composite granules, thickly coated with SiC from the SiC source 128.

Alternatively, the mixing step 124 may be done entirely in the dry state, involving mixing of the silicon carbide material 126 with the composite granules from step 122 to form an intimate dry mixture, for subsequent shaping at shaping step 130. In this regard, the granulating step 128 is bypassed, and generally the silicon carbide 126 would also be in granulated form for uniform mixing with the composite granules from step 122. In this case, the granules forming silicon carbide 126 would generally contain desired sintering/processing additives and binders, in a similar fashion to the composite granules formed at step 122.

At shaping step 130, either the dry mixture formed at step 124 or the granulated product formed at step 128 is shaped to form a green body for sintering at step 132. Various shaping techniques may be employed, most common of which include pressing, such as die pressing at room temperature, also known as cold pressing. Cold isostatic pressing (CIP), extrusion, injection molding and gel casting are other techniques used to form green bodies prior to sintering. Following shaping, the shaped body is sintered at step 132 to densify the shaped body. Sintering may be carried out by pressureless sintering, such as at a temperature within a range of about 1850° C. to about 2350° C., such as 1950° C. to about 2200° C. Sintering may also be carried out in an environment in which the shaped body is subjected to an elevated pressure, such as hot pressing and hot isostatic pressing. In these cases, the sintering temperature may be lowered due to the addition of pressure, whereby densification may be carried out at lower temperatures. Sintering may be carried out in an inert environment, such as a noble gas or nitrogen.

The ceramic component formed as a result of the foregoing process flow generally contains a global continuous matrix phase forming a sintered ceramic body, the global matrix phase having a composition including the ceramic material incorporated at mixing step 124. In the embodiment described above, that material is silicon carbide 126. While the foregoing embodiment focused on formation of a ceramic body having a composition comprising silicon carbide, other base materials such as zirconia ($ZrO_2$), and alumina ($Al_2O_3$), and combinations thereof may also be utilized depending upon the end use of the ceramic component. Most typically, ceramic material added at the mixing step 110 along with graphite 114 is generally the same as ceramic material incorporated at mixing step 124. In accordance with the foregoing embodiment, that same material is silicon carbide, although materials such as zirconia and alumina may also be utilized, as noted above.

Further, certain embodiments contemplate utilization of precursor material that is used to form the composite granules, which is a precursor to the desired final ceramic material. By way of example, silicon carbide 112 may be substituted with silica ($SiO_2$), which converts to silicon carbide during the high temperature sintering operation.

The ceramic component formed following sintering has a plurality of inclusions dispersed in the global matrix phase of the ceramic body, each inclusion including a graphite phase and a ceramic phase and defining a graphite-rich region. In the embodiment described above, the ceramic phase of the inclusions is silicon carbide. The inclusions are easily identifiable as such in the finally formed ceramic component, such as by any one of various known characterization techniques including scanning electron microscopy. The inclusions typically have an average size within a range of about 10 to about 400 microns, such as within a range of about 20 to 200 microns. Particular embodiments have inclusions having an average size within a range of about 30 to 150 microns. Particular working embodiments have been found to have 75 to 100 micron inclusions.

This ceramic component typically has a relatively high density, greater than about 85%, most typically greater than about 90% of theoretical density. Particular examples have demonstrated even higher densities, such as greater than 93% and even greater than 95% of theoretical density.

Figure 2:
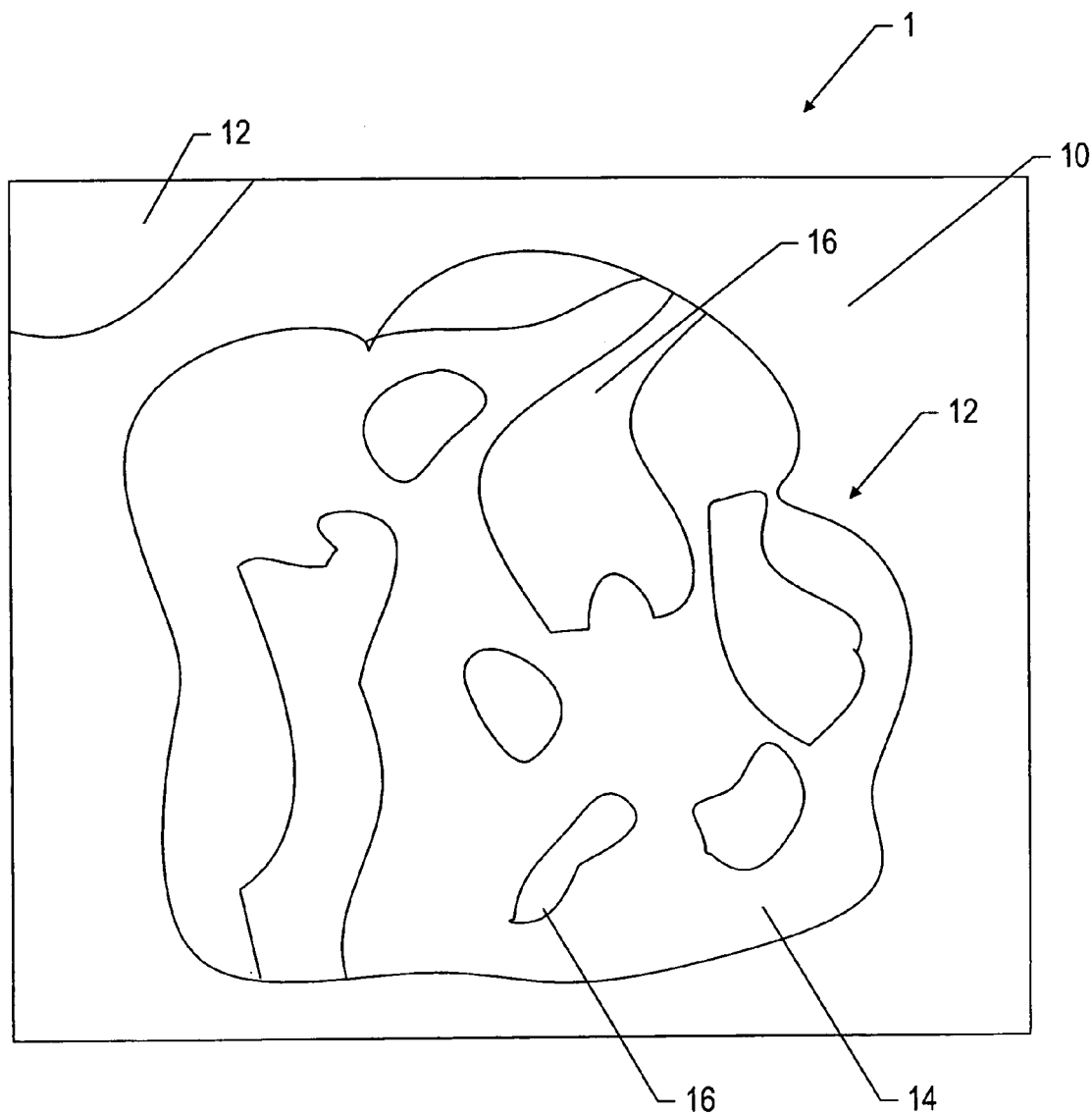
FIG. 2 depicts a structure of the ceramic component, illustrating an inclusion in a ceramic body.

Typically, the overall content of the graphite in the ceramic component falls within a range of about 2 weight percent to about 20 weight percent graphite, such as within a range of about 5 weight percent to about 15 weight percent graphite. According to a particular feature of the present invention, the inclusions have essentially a multi-phase structure including a first phase formed of the ceramic material such as silicon carbide 112, which forms an interconnected inclusion matrix phase which has a skeletal structure, in which the graphite is embedded. This skeletal structure or continuous matrix phase of ceramic material of the inclusions advantageously functions to anchor the graphite (or other lubricious material) in each inclusion, improving the mechanical stability of the graphite. In this regard, attention is drawn to FIG. 2, depicting ceramic component 1 having sintered ceramic body having a global matrix phase 10, in which a plurality of inclusions 12 are embedded. Each inclusion 12 includes continuous matrix phase 14, in which graphite 16 is embedded. In the context of the embodiment described above, the global matrix phase 10 and the continuous matrix phase in the inclusion 12 are both formed of silicon carbide.

In addition, according to another feature of the present invention, incorporation of a ceramic material to form ceramic/graphite granules which eventually form the inclusions 12, aids in sintering and densification of the ceramic component. Particularly, it was found that single phase graphite granules tend to act as pinning centers during the sintering process and prevent desired shrinkage and reduction in porosity of the ceramic component. Accordingly, single-phase graphite granules tend to prevent effective sintering. Use of composite granules containing a ceramic phase such as silicon carbide enables shrinkage of the inclusions, thus attenuating the pinning effects of otherwise single-phase graphite. Accordingly, the relatively high densities described above can be achieved, even with relatively high graphite loading as described herein. To clarify, the ceramic material of the ceramic/graphite granules is present in an unsintered form, such as in powder form as described above, which advantageously shrinks and densities along with sintering and densification of the global matrix phase.

According to embodiments of the present invention, the resulting ceramic component may find particular use as a seal, such as a water pump seal that finds practical use in automotive applications. The seal may take on any one of various geometric configurations, annular ones being fairly common, having an outer contour matching the contour of the components to be sealed, and having an inner periphery for passage of fluid, including gases and liquids.

EXAMPLES

Example 1

1 Kg batch was prepared, including 925 g Hexoloy SA silicon carbide and 75 g synthetic graphite ($d_{50}$=6 μm), forming a 92.5% SiC and 7.5% graphite batch. The details are provided below.

A quantity of Hexoloy SA slurry containing 75 g of solids was combined with a synthetic graphite powder slurry containing 75 g of solids. Binders, surfactants and a polymeric carbon source are added to the combined slurries and mixed. This material is then spray dried.

A second quantity Hexoloy SA slurry containing 850 g of solids is mixed with a slurry containing 150 g of solids from the previously made spray dried material described above. To this combined slurry, binders, surfactants and a polymeric carbon source are added and mixed together. This hybrid slurry is then spray dried to produce the final batch product.

Following preparation of the batch material, a green body was formed, dried and fired in accordance with the process techniques disclosed in U.S. Pat. No. 4,179,299. Namely, the green body was sintered in a static Ar atmosphere, at 2200° C. for 1 hr to form a sintered body. Additional process details are provided in the '299 patent.

Table 1 compares density, friction and wear properties of Example 1 as described above, with respect to Comparative Example 1, which is a state of the art silicon carbide material from Saint-Gobain Ceramics and Plastics, known as Hexoloy SA.

TABLE 1

| SAMPLE | SINTERED DENSITY (g/cc) | FRICTION COEFFICIENT | TILE WEAR COEFFICIENT (mm³/N · m) |
|---|---|---|---|
| E1 | 2.80 | 0.44 | 9.13E−06 |
| CE1 | 3.16 | 0.41 | 4.54E−07 |

What is claimed is:

1. A method for forming a ceramic component, comprising:
    providing particles of a first ceramic material;
    granulating particles of graphite and particles of a second ceramic material to form granules containing graphite and second ceramic material;
    mixing the granules with the particles of the first ceramic material to form a mixture, wherein the granules comprise a different material as compared to the particles of the first ceramic material, and wherein mixing the granules and the particles of the first ceramic material is performed after granulating the particles of graphite and the particles of the second ceramic material;
    forming a shaped body from the mixture; and
    sintering the shaped body.

2. The method of claim 1, wherein granulating is carried out by casting or by spray tying.

3. The method of claim 2, wherein granulating is carried out by spray drying.

4. The method of claim 1, wherein the mixture is in the form of a slurry, and further comprising a step of granulating the slurry to form a granulated product for forming the shaped body.

5. The method of claim 1, wherein the granules comprise about 5 to about 65 wt % of said second ceramic material.

6. The method of claim 1, wherein the granules have an average size within a range of about 10 microns to about 400 microns.

7. The method of claim 1, wherein the shaped body is formed by pressing.

8. The method of claim 1, wherein sintering is carried out by a pressureless sintering.

9. The method of claim 1, wherein the particles of the first ceramic material comprises SiC.

10. The method of claim 9, wherein the particles of the first ceramic material comprises alpha SiC, beta SiC, or a combination of alpha SiC and beta SiC.

11. The method of claim 1, wherein the first and second ceramic materials are the same material.

12. The method of claim 9, wherein the particles of the first ceramic material consist essentially of SiC.

13. The method of claim 1, further comprising adding a fluid to the granules after granulating the particles of graphite and the particles of the second ceramic material, and before forming the shaped body.

14. A method for forming a ceramic component, comprising:
    providing particles of a first ceramic material, wherein the particles of the first ceramic material are substantially free of graphite;
    granulating particles of graphite and particles of a second ceramic material to form granules containing graphite and second ceramic material;
    mixing the granules with the particles of the first ceramic material to form a mixture, wherein mixing the granules and the particles of the first ceramic material is performed after granulating the particles of graphite and the particles of the second ceramic material;
    forming a shaped body from the mixture; and
    sintering the shaped body.

15. A method for forming a ceramic component, comprising:
    providing particles of a first ceramic material;
    granulating particles of graphite and particles of a second ceramic material to form first granules containing graphite and the second ceramic material;

adding the particles of the first ceramic material and a fluid to the first granules, wherein adding the particles of the first ceramic material and the fluid is performed after granulating the particles of graphite and the particles of the second ceramic material;

mixing the first granules, the particles of the first ceramic material, and the fluid to form a mixture;

forming a shaped body from the mixture; and sintering the shaped body.

16. The method of claim 15, further comprising:

mixing the particles of graphite and the particles of the second ceramic material before granulating the particles of graphite and the particles of the second ceramic material; and granulating the first granules and the particles of the first ceramic material to form second granules containing graphite, the first ceramic material, and the second ceramic material, wherein the second granules are formed after mixing the first granules, the particles of the first ceramic material, and the fluid, wherein forming the shaped body is performed such that the shaped body includes the second granules.

17. The method of claim 15, wherein granulating the particles of graphite and the particles of the first ceramic material is carried out by spray drying or casting.

* * * * *

UNITED STATES PATENT AND TRADEMARK OFFICE
CERTIFICATE OF CORRECTION

PATENT NO.        : 7,534,388 B2
APPLICATION NO.   : 11/078599
DATED             : May 19, 2009
INVENTOR(S)       : Vimal K. Pujari et al.

Page 1 of 1

It is certified that error appears in the above-identified patent and that said Letters Patent is hereby corrected as shown below:

Column 6, line 18, please delete "tying" and insert therefor --drying--.

Signed and Sealed this
Fifth Day of July, 2011

David J. Kappos
*Director of the United States Patent and Trademark Office*